Figure 1:
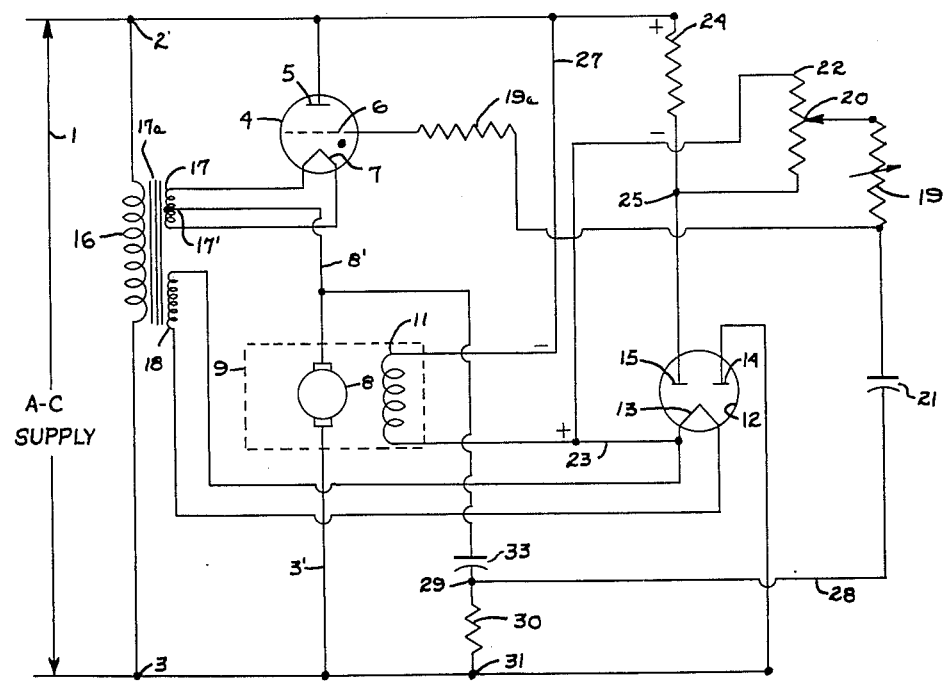

Nov. 13, 1951     B. A. KNAUTH ET AL     2,574,976
SYSTEM FOR THYRATRON CONTROL
Filed March 1, 1948     2 SHEETS—SHEET 1

INVENTORS
BERTHOLD A. KNAUTH
AND PAO H. CHIN
BY
Semmes, Keegin, Robinson & Semmes
ATTORNEYS

INVENTORS
BERTHOLD A. KNAUTH
AND PAO H. CHIN

Patented Nov. 13, 1951

2,574,976

UNITED STATES PATENT OFFICE 2,574,976

SYSTEM FOR THYRATRON CONTROL

Berthold A. Knauth, Bolton, N. Y., and Pao Hsiung Chin, Cranford, N. J., assignors, by direct and mesne assignments, to The Motorspeed Corporation, New York, N. Y.

Application March 1, 1948, Serial No. 12,322

4 Claims. (Cl. 318—345)

Our invention relates to controlling the firing angle of thyratron tubes in which it has many applications, such as arc-welding, resistance welding, servo mechanisms, the control of the rate of rotation of electric motors, and other applications which will be apparent from the ensuing description.

While the drawings illustrate the system as applied to the control of the rate of rotation of a direct current motor, it will be apparent that the system has many other applications in industry where similar electrical conditions are desired in operating circuits.

In the particular illustrations which we have shown in the drawings, one of the important objects of the invention is to maintain a constant speed, with automatic compensation for change in the load imposed on the motor. A particular use for this system is to maintain a constant speed in, for instance, a pumping mechanism, where the motor may be subjected to varying loads by reason of the change in viscosity of the liquid which is being pumped.

In controlling the firing of thyratron tubes which are grid-controlled gaseous discharge devices that permit the passage of current in only one direction, there are several factors which, in general, effect the firing of the tubes. Control of the output of the tubes can be effected by controlling the firing angle which is dependent on a combination, among others, of the following factors: (1) The grid-to-cathode potential, or grid bias, of the tube as effected by the net instantaneous algebraic sum of the voltage or voltages applied to the grid; (2) The simultaneously occurring anode-to-cathode potential of the tube which is the net instantaneous algebraic sum of all the voltages applied to the anode, which in this instance includes both the alternating supply voltage and the counter E. M. F. of the motor armature. It is believed to be unnecessary to fully explain the operation of the combination of factors above mentioned. However, it can be stated that we have achieved improvements in the creation and control of these factors over other systems known in the art.

In our system we employ means for utilizing an adjustable direct potential, which is one component of voltage by which the grid of the thyratron tube is biased, and which is derived indirectly from the source of alternating current with which the system is supplied, and thus we obtain an adjustable reference voltage without the use of auxiliary equipment.

The phase shifting of the alternating current potential applied to the grid has been accomplished in a novel manner which gives more complete and accurate control of the operating characteristics of the system than has heretofore been possible.

A feature of considerable importance in our system is the means which we have employed to impose in the grid-cathode circuit an adjustable reference voltage which may be either positive or negative in sense and of adjustable magnitude. The arrangement we have made for accomplishing this desirable result is in itself novel, inasmuch as it is done from a voltage at another potential level and without the use of an outside voltage source.

This feature of our system wherein the D. C. component of grid bias can be made negative with respect to the cathode makes it possible to reduce the motor to zero speed, a result which could not have been obtained in the prior art, except by the imposition of an outside negative voltage.

Because we have provided means for making the D. C. component of grid bias of the thyratron tube negative with respect to the cathode, we can control the speed of the motor when it is running in the reverse direction with a reversed polarity of counter E. M. F. and when the thyratron circuit is inverting as distinguished from rectifying. For instance, where the motor is being used in a hoist mechanism, we can allow the motor to turn in reverse under an outside force and control the speed of this reverse motion by control of the electrical counter torque on the motor. In this instance, the system operates as a brake and governor when the motor is turned in reverse by, for instance, the weight of the load on the cable of the hoist mechanism. In reverse, the motor is paying out under a load which causes it to rotate in reverse, creates an E. M. F. which tends to make the net D. C. component of grid voltage of the thyratron tube positive. This would tend to fire the tube for a forward motion of the motor, so to control the firing of the tube for this reversed motion, we have imposed an additional negative potential in the grid circuit which can be made of a desired value to control automatically the speed of the motor turning in reverse, thus acting as an automatic governor or speed limiter. The magnitude of the current supplied by the tube is then a function of the reverse speed of rotation which is caused by the outside turning force (i. e., gravity acting on the load in the present instance), and the electromagnetic torque necessary to limit the speed to this pre-set value.

Figure 2:
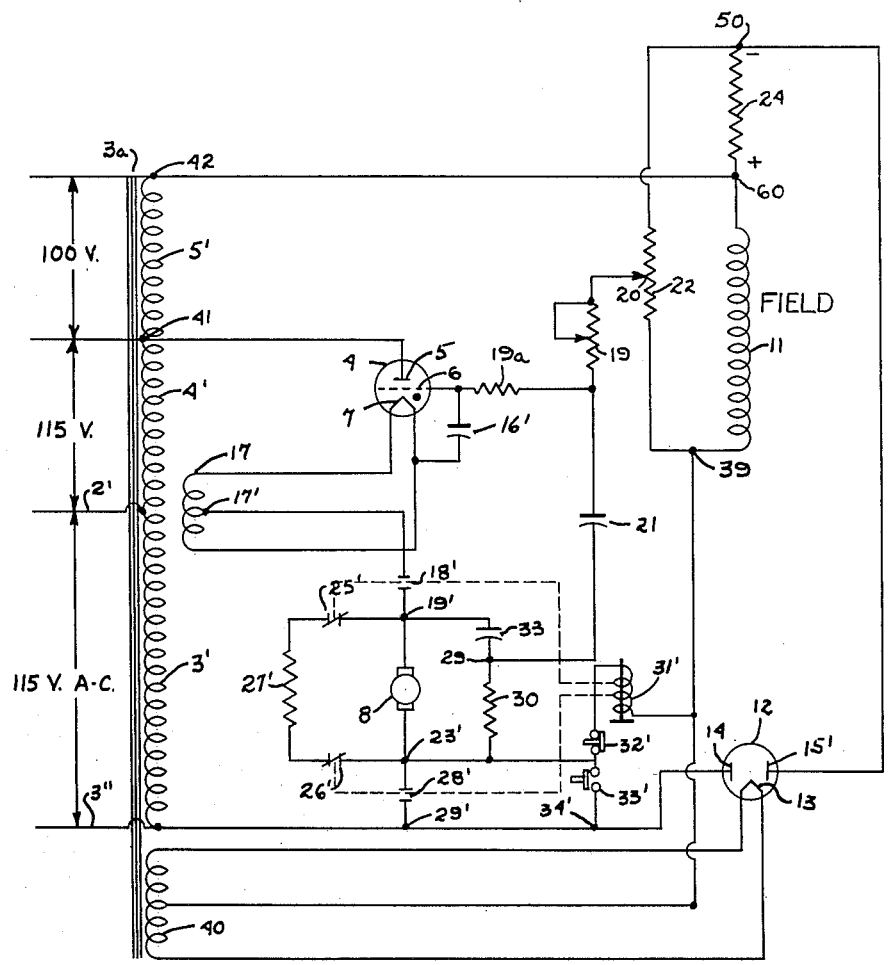

In the drawings, Figure 1 in a diagrammatic view of our system as applied to a direct current motor; and Figure 2 is a diagrammatic view of a modified embodiment of our system.

Referring to Figure 1, there is illustrated a pair of conductors 2 and 3 connected to an alternating current supply 1. Between these conductors 2 and 3 is connected a series circuit including the thyratron 4 and the armature 8 of a direct current motor 9. The anode 5 of the thyratron 4 is connected to the conductor 2 and the cathode 7 is connected to the cathode heating winding 17 of the transformer 17a having a primary winding 16 connected to the A. C. supply. The center tap 17' of the cathode heating secondary winding 17 is connected to the conductor 8' and through this conductor to one of the brushes of the armature 8 of the direct current motor; the other brush of this armature is connected to the conductor 3' which in turn is connected to the alternating current line 3. The primary winding of the transformer 17a is also connected between the alternating current lines or conductors 2 and 3. This transformer is also provided with an additional cathode heating secondary winding 18 employed for the purpose of heating the cathode 13 of the rectifier tube 12 that is connected to this winding. The cathode 13 is also connected through the conductor 23 to one end of the field winding 11 of the motor 9 and the other end of this field winding 11 is connected to the line 2 by the lead 27. A potentiometer 22 is connected between the anode 15 and the cathode 13 of the rectifier 12 and the resistor 24 is connected between this anode 15 and the line 2. A pair of resistors 19 and 19a are connected between the tap 20 of the potentiometer 22 and the grid 6 of the thyratron 4. The connection between the resistors 19 and 19a is connected to one terminal of the capacitor 21 and the other terminal of this capacitor is connected by the line 28 to the connection 29 between the capacitor 33 and the resistor 30. The other terminal of the capacitor 33 is connected to the line 8' between the thyratron cathode heating secondary and the armature 8 and the other terminal of the resistor 30 is connected to the point 31 on the line 3. The other anode 14 of the rectifier 12 is also connected to the point 31 of the line 3.

The thyratron tube 4 furnishes direct current during ½ of the alternating current supply cycle to the armature of the motor 9 which is connected in series with the thyraton 4 between the alternating current lines 2 and 3. Thus, direct current in pulses is supplied to the armature 8 of the motor 9; the portion of these pulses occurring during the half cycle in which they were initiated is determined by the grid bias applied to the grid 6 of the thyratron 4. Direct current is also supplied to the field winding 11 of the motor 9 from the alternating current supply lines 2 and 3 by means of the rectifier tube 12. Both armature and field of the direct current motor 9 are supplied with unidirectional current from the same alternating current supply lines without separate insulating windings. This is possible by employing the double anode rectifier 12, having anode 15 connected to the alternating current line 2 through the resistor 24 and anode 14 connected to the alternating current line 3.

The cathode 13 of the rectifier 12 is connected by the lead 23 to one end of the field 11 and the other end of this field is connected by the lead 27 to the A. C. supply line 2 so that the field 11 receives direct current from the alternating current lines 2 and 3 through the section of the rectifier 12 including the cathode 13 and the anode 14, during the half cycle when the alternating current line 3 is positive with respect to the alternating current line 2. As was previously explained the armature 8 of the motor 9 received direct current pulses through the thyratron 4 and these direct current pulses are obtained during the half cycle when the line 2 is positive with respect to the line 3. However, the current in the field winding 11 is maintained during the half cycle when this field is not being energized from the A. C. lines 2 and 3, that is, during half cycle when the line 2 is positive with respect to the line 3 and when the armature 8 is being energized through the thyratron 4. The current in the field winding 11 is maintained during this latter half cycle by the section of the rectifier 12 including the cathode 13 and the anode 15 and the resistor 24. This section of the rectifier 12 and the resistor 24 are connected in series across the field 11 in a shunting-tube rectifier circuit arrangement.

Another embodiment of this invention is shown in Figure 2 and the corresponding parts of Figures 1 and 2 bear the same reference numerals. Between the conductors 2' and 3" is connected the primary of the auto transformer 3a having two extensions or secondary windings 4' and 5'. To the end of extension 4' of the auto transformer 3a at point 41 is connected a series circuit including a thyratron 4 and the armature 8 of a direct current motor. The cathode 7 of the thyratron tube 4 is connected to a secondary winding 17 of the transformer 3a. The center 17' of the secondary winding 17 is connected to the armature 8 of the direct current motor through one normally open contact 18' of the relay 31'. The other terminal of the motor armature is connected through the second normally opened contact 28' of the relay 31' to conductor 3" at point 29'.

The anode 5 of the thyratron tube 4 is connected to secondary extension 4' of transformer 3a at point 41. The field winding 11 of the direct current motor is connected to the secondary 5' of transformer 3a at point 42. The other end of this field winding 11 is then connected to the center tap of a cathode heating winding 40 of transformer 3a. The winding 40 of transformer 3a is supplied to heat the cathode 13 of the full wave rectifier tube 12. Anode 14 of rectifier tube 12 is connected directly to conductor 3" of the A. C. line. Trailing anode 15' of tube 12 is connected to the resistor 24 at point 50. Between points 50 and 60 is connected resistor 24 completing the shunting tube circuit. Potentiometer 22 is connected across the addition voltages of resistor 24 and field winding 11 between points 60 and 39.

The slider 20 of potentiometer 22 is connected to one end of an adjustable resistor 19. The other end of resistor 19 is connected to a capacitor 21 and to a grid resistor 19a. The further end of grid resistor 19a is connected then to the grid 6 of thyratron tube 4. A smaller capacitor 16' is connected between the grid 6 of thyratron tube 4 and the cathode 7 of thyratron 4 to prevent misfiring of the thyratron owing to a transient change in anode potential. The second terminal of capacitor 21 is then connected to the junction 29 of capacitor 33 and resistor 30. The combination of capacitor 33 and resistor 30 is connected across the armature 8 of the direct current motor at points 19' and 23'.

Points 19' and 23' are also connected through contacts 25' and 26' of the relay 31' to dynamic braking resistor 27'. Between the end 39 of the motor field 11 and the A. C. conductor 3" are connected the winding of relay 31' through a normally closed stop button 32' and a normally open start button 33' at point 34'. The relay 31' is equipped with a copper jacket on the core thereof that constitutes a short circuited turn which functions to maintain flux in the relay's magnetic circuit so that this relay is operable on unidirectional pulses having a frequency of 60 cycles per second.

Closing the start button 33' causes the relay 31' to close contacts 28' and 18'. A circuit is thus established from point 39 through the relay coil 31', the stop button 32' and the contact 28' and point 29'. The relay 31' will therefore remain in an energized position until the stop button 32' is opened interrupting the aforesaid circuit. When the stop button 32' is opened contacts 18' and 28' open while contacts 25' and 26' are closed. This last results in shunting of the armature 8 of the direct current motor through the load resistor 27' which results in a phenomenon known as dynamic braking.

The unidirectional current between the cathode 13 and anode 14 of rectifier tube 12 which supplied the field winding 11 produces a D. C. component of flux in the core of transformer 3a that tends to neutralize, but may only minimize and not fully neutralize, the D. C. component of flux which results from the unidirectional armature current supplied by the secondary winding 4' of the auto transformer 3a and thereby enables the use of a transformer designed to operate at more normal flux densities.

The resistor 30 may be made variable if desired so as to permit control of the voltage ripple across capacitor 33. This resistor 30 is also connected in series with the phase shifting circuit including capacitor 21 and resistor 19 and that portion of the potentiometer 22 voltage between tap 20 and line 42 or 60 which phase shifting circuit combination furnishes an A. C. voltage component from the lines 2' and 3" to the grid 6 of the thyratron, shifted in phase with respect to the phase of the voltage on the lines 2 and 3 by approximately 90 degrees lagging and biased by the D. C. component between points 20 and 60.

The wave form of the potential across the capacitor 33 may not resemble the wave form of the potential across the armature 8 inasmuch as it averages the counter E. M. F. plus IR drop in the armature. The ratio of values of resistance 30 to capacitance 33 determines the amount of ripple appearing across capacitance 33 in addition to the average of counter E. M. F. plus IR drop. Proper combination of the values of capacitor 33 and resistor 30 relative to the value of resistance 19 and capacitance 21 in this circuit tends to maintain the speed of the motor at any pre-set no-load value while the load on the motor is varied from no-load to full load, that is, the thyratron firing is shifted to compensate for changes in average armature current independently of, and not requiring, a change in speed.

While we have described embodiments of this invention in detail it is of course understood that we do not desire to limit it to those details except as they are defined by the claims.

We claim:

1. A thyratron control system for controlling a direct current motor comprising a thyratron having an anode, a grid and a cathode, a direct current motor having an armature, a pair of lines connected to a source of alternating current, one of said lines connected to said thyratron anode, a relay having a pair of contacts, one of said contacts on each side of said motor armature, a rectifier for rectifying said alternating current to supply direct current pulses to said motor field, a normally closed "stop" switch, a normally open "start" switch, connections for connecting said "stop" switch, said "start" switch and said relay in series across said rectifier to energize said relay from the inverse voltage of said rectifier, and connections for connecting said "start" switch across one of said pair of contacts whereby said contact functions as a holding-in contact for said relay after said "start" switch is closed and released.

2. A thyratron control current for control of a direct current motor comprising a thyratron having an anode, a cathode, and a grid, an alternating current supply, a direct current motor connected to the cathode of the thyratron, said motor and said thyratron being connected in series across the alternating current supply, a capacitor and a resistor connected in series across the armature of the motor, connections from the junction of the capacitor and resistor to the grid of the thyratron, a double anode rectifier having one anode connected to a first terminal of an alternating current supply, the other anode connected to a second terminal of the alternating current supply and the cathode connected to one terminal of the field winding, the other terminal of the field winding being connected to the first terminal of the alternating current supply, a resistor in the connections of the first terminal of the alternating current supply to the anode of the rectifier, and connections including a potentiometer connecting the junction of the resistor and the anode with the connection between the cathode and the field, and connections between the slide contact of the potentiometer and the grid.

3. A thyratron control circuit for control of a direct current motor comprising a thyratron having an anode, a cathode, and a grid, an alternating current supply, a direct current motor connected to the cathode of the thyratron, said motor and said thyratron being connected in series across the alternating current supply, a capacitor and a resistor connected in series across the armature of the motor, connections from the junction of the capacitor and resistor to the grid of the thyratron, a double anode rectifier having one anode connected to a first terminal of an alternating current supply, the other anode connected to a second terminal of an alternating current supply and the cathode connected to one terminal of the field winding, the other terminal of the field winding being connected to the first terminal of the alternating current supply, a resistor in the connections of the first terminal of the alternating current supply to the anode of the rectifier, connections including a potentiometer connecting the junction of the resistor and the anode with the connection between the cathode and the field, and connections including a variable resistor between the slide contact of the potentiometer and the connections between the grid of the thyratron and the junction of the capacitor and resistor.

4. A thyratron control circuit for control of a direct current motor comprising a thyratron having an anode, a cathode and a grid, a direct current motor in series with the thyratron and connected to the cathode thereof, said thyratron and motor being connected across an alternating current supply, a capacitor and a resistor connected in series across the armature of the motor, means connecting the junction of the capacitor and the resistor with the grid of the thyratron, a double anode rectifier having the anodes connected across the alternating current supply and the cathode connected to a terminal of the field winding of the motor, and means connecting the other terminal of the field winding with the anode of the thyratron whereby the current flows in opposite half cycles in the armature and field of the motor.

BERTHOLD A. KNAUTH.
PAO HSIUNG CHIN.

REFERENCES CITED

The following references are of record in the file of this patent:

UNITED STATES PATENTS

| Number | Name | Date |
|---|---|---|
| 2,082,496 | Howe | June 1, 1937 |
| 2,236,086 | Conover | Mar. 25, 1941 |